US011729186B2

(12) United States Patent
Ajayi et al.

(10) Patent No.: US 11,729,186 B2
(45) Date of Patent: Aug. 15, 2023

(54) BLOCKCHAIN ARCHITECTURE FOR COMPUTER SECURITY APPLICATIONS

(71) Applicant: Research Foundation of the City University of New York, New York, NY (US)

(72) Inventors: Oluwaseyi Ajayi, Bronx, NY (US); Tarek Saadawi, Franklin Lakes, NJ (US); Obinna Igbe, Bronx, NY (US)

(73) Assignee: Research Foundation of the City University of New York, New York, NY (US)

( * ) Notice: Subject to any disclaimer, the term of this patent is extended or adjusted under 35 U.S.C. 154(b) by 565 days.

(21) Appl. No.: 16/592,303

(22) Filed: Oct. 3, 2019

(65) Prior Publication Data
US 2020/0112572 A1    Apr. 9, 2020

Related U.S. Application Data

(60) Provisional application No. 62/741,276, filed on Oct. 4, 2018.

(51) Int. Cl.
*H04L 9/40* (2022.01)
*G06F 16/23* (2019.01)
(52) U.S. Cl.
CPC ...... *H04L 63/1416* (2013.01); *G06F 16/2379* (2019.01); *H04L 63/1425* (2013.01)
(58) Field of Classification Search
CPC ............. H04L 63/1416; H04L 63/1425; H04L 2209/38; H04L 2209/56; H04L 9/3247;
(Continued)

(56) References Cited

U.S. PATENT DOCUMENTS 10,200,196 B1 *  2/2019  Rodriguez De Castro ................. G06F 12/1408
10,826,681 B1 * 11/2020  Dayan ................... H04L 9/0637
(Continued)

OTHER PUBLICATIONS

Raja et al., "Intrusion Detector for Blockchain based IoT Networks," 2018 Tenth International Conference on Advanced Computing (ICoAC) Year: 2018 | Conference Paper | Publisher: IEEE.*
(Continued)

*Primary Examiner* — Roderick Tolentino
(74) *Attorney, Agent, or Firm* — Peter J. Mikesell; Schmeiser, Olsen & Watts, LLP

(57) ABSTRACT

A computer security system comprises at least one authorized node constructed and arranged to execute a consensus protocol for validating and verifying a blockchain transaction and to extract at least one of a signature or feature of a detected cyberattack for the blockchain transaction and mining the transaction to a blockchain network; at least one unauthorized node prohibited from executing the consensus protocol and from validating and verifying a blockchain transaction but authorized to retrieve the at least one of the signature or feature from the blockchain network; and a special-purpose processor of the blockchain network that facilitates a distribution of the at least one of signature or feature for cooperative intrusion detection between the at least one authorized node and the at least one unauthorized node.

19 Claims, 18 Drawing Sheets

(58) Field of Classification Search
CPC ... G06F 16/2379; G06F 21/6245; G06F 21/64
See application file for complete search history.

(56) References Cited

U.S. PATENT DOCUMENTS

| | | | |
|---|---|---|---|
| 2017/0103468 | A1 | 4/2017 | Orsini et al. |
| 2017/0374091 | A1 | 12/2017 | Igbe et al. |
| 2018/0191751 | A1* | 7/2018 | El-Moussa .......... G06F 16/9024 |
| 2018/0232526 | A1* | 8/2018 | Reid ...................... H04L 9/3213 |
| 2018/0352033 | A1* | 12/2018 | Pacella ................... H04L 67/10 |
| 2019/0036682 | A1* | 1/2019 | Qiu ........................ H04L 9/3265 |
| 2019/0036906 | A1* | 1/2019 | Biyani .................... H04L 63/20 |
| 2019/0036957 | A1* | 1/2019 | Smith .................... H04L 9/3239 |
| 2019/0042478 | A1* | 2/2019 | Chakrabarti ............ G06F 21/71 |
| 2021/0264051 | A1* | 8/2021 | Koide ....................... G06F 9/50 |

OTHER PUBLICATIONS

Meng et al., "When Intrusion Detection Meets Blockchain Technology: A Review," Year: 2018 | vol. 6 | Journal Article | Publisher: IEEE (294).*
Nakamoto, S.; Bitcoin: A Peer-to-Peer Electronic Cash System; Www.Bitcoin.Org; 9 pages; 2008.
Abdullah, N.: Blockchain based Approach to Enhance Big Data Authentication in Distributed Environment; Research Gate Conference Paper; Jul. 2017; pp. 887-892.
Zyskind, Z. et al.; Decentralizing Privacy: Using Blockchain to Protect Personal Data; IEEEE; Conference Paper; May 2015; pp. 180-184.
Lei, A. et al.; Blockchain-Based Dynamic Key Management for Heterogeneous Intelligent Transportation Systems; IEEE Internet of Things Journal; Dec. 2017; pp. 1832-1843; vol. 4, No. 6.
Igbe, O. et al.; Denial of Service Attack Detection using Dendritic Cell Algorithm; Conference: The 8th IEEE Annual Ubiquitous Computing, Electronics & Mobile Communication Conference (UEMCON 2017); Oct. 2017; 7 pages.
IGBE, O. et al.; Detecting Denial of Service Attacks Using a Combination of Dendritic Cell Algorithm and the Negative Selection Algorithm; 2017 IEEE International Conference on Smart Cloud (SmartCloud); Nov. 2017; 7 pages; DOI: 10.1109/SmartCloud.2017.18.
Kurundkar, G.D. et al.; Network Intrusion Detection using SNORT; International Journal of Engineering Research and Applications (IJERA); Mar.-Apr. 2012; pp. 1288-1296; vol. 2, Issue 2.
Bye, R, et al.; Collaborative Intrusion Detection Framework: Characteristics, Adversarial Opportunities and Countermeasures; Conference: Proceedings of the 2010 international conference on Collaborative methods for security and privacy; Aug. 2010; 12 pages.
Ahram, T. et al.; Blockchain Technology Innovations; 2017 IEEE Technology & Engineering Management Conference (TEMSCON); Jun. 2017; 5 pages; DOI: 10.1109/TEMSCON.2017.7998367.
Patel, D. et al.; Blockchain Exhumed; Conference Paper—ISEA Asia Security and Privacy (ISEASP); Jan. 2017; 12 pages; DOI: 10.1109/ISEASP.2017.7976993.
EVRY; Blockchain: Powering the Internet of Value, EVRY. URL: https://www.evry.com/globalassets/insight/bank2020/bank-2020--blockchain-powering-the-internet-of-value--whitepaper.pdf; 2017; 50 Pages.
Sankar, S. et al.; Survey of Consensus Protocols on Blockchain Applications; IEEE; 2017 International Conference on Advanced Computing and Communication Systems (ICACCS-2017), Jan. 6-7, 2017, Coimbatore, India; 5 pages.

* cited by examiner

BLOCKCHAIN ARCHITECTURE FOR COMPUTER SECURITY APPLICATIONS

RELATED APPLICATIONS

This application claims priority to U.S. Provisional Application Ser. No. 62/741,276, filed on Oct. 4, 2018 entitled "BLOCKCHAIN ARCHITECTURE FOR CYBERATTACK SIGNATURES DEPOSITORY", the entirety of which is incorporated by reference herein.

FIELD

The present concepts relate generally to computer security, and more particular, to distributed ledger technology for the detection and/or prevention of cyberattacks on computers or computer networks

BACKGROUND

Modern cyberattacks are emerging in diverse forms which makes them become more sophisticated and harder to detect. One approach for identifying malicious activities in computer networks includes the use of an intrusion detection system (IDS), which has proven to be effective in identifying malicious activities in computer networks. For example, an IDS can capture and store attack "signatures" or related data sequences when malicious activity occurs, so that if a cyberattack reoccurs, the IDS can rely on the stored attack signatures to detect attempts to exploit a software vulnerability.

However, an IDS is typically constructed to provide a single vantage point for performing activities, which can limit their capabilities in detecting coordinated or distributed attacks. As a result, it is possible for some attacks to go undetected or not detected on time. Also, a zero-day attack (attack without a known signature) experienced in an organization's IDS located in one location, for example, New York, USA, may be different from that experienced in at another IDS, for example, located in London, UK.

SUMMARY

In one aspect, a computer security system comprises at least one authorized node constructed and arranged to execute a consensus protocol for validating and verifying a blockchain transaction and to extract at least one of a signature or feature of a detected cyberattack for the blockchain transaction and mining the transaction to a blockchain network; at least one unauthorized node prohibited from executing the consensus protocol and from validating and verifying a blockchain transaction but authorized to retrieve the signature or feature from the blockchain network; and a special-purpose processor or the blockchain network that facilitates a distribution of the cyberattack signature or feature for cooperative intrusion detection between the at least one authorized node and the at least one unauthorized node.

In another aspect, a method for tracking cyberattacks using a blockchain architecture comprises detecting a cyberattack using an intrusion detection system; extracting at least one signature or feature from the cyberattack and converting the at least one signature of feature to a standard format, thereby producing a first transaction; digitally signing the first transaction with a private key of the user, thereby producing an encrypted first transaction; submitting the encrypted first transaction to a blockchain network for transaction verification; distributing the encrypted first transaction to every node in the blockchain network; validating the encrypted first transaction at a validating node, thereby producing a new block; and updating the blockchain network with the new block; and permitting a query by either a plurality of authorized nodes and unauthorized nodes to access contents of the new block.

In another aspect, a method for tracking cyberattacks, comprises detecting a cyberattack using an intrusion detection system; extracting, by an authorized node of a combination of authorized nodes and unauthorized nodes at least one signature or feature from the cyberattack; attaching by the authorized node the extracted at least one signature or feature to a blockchain; updating a blockchain ledger with a new block including the at extracted at least one signature or feature; and distributing data regarding the updated blockchain ledger to all nodes of the combination of authorized and unauthorized nodes.

In another aspect, a computer program product for tracking cyberattacks, the computer program product comprises a computer readable storage medium having computer readable program code embodied therewith. The computer readable program code comprises computer readable program code configured to detect a cyberattack; computer readable program code configured to extract at least one signature or feature from the cyberattack; computer readable program code configured to attach the extracted at least one signature or feature to a blockchain; computer readable program code configured to update a blockchain ledger with a new block including the at extracted at least one signature or feature; and computer readable program code configured to distribute data regarding the updated blockchain ledger to all nodes of the combination of authorized and unauthorized nodes.

BRIEF DESCRIPTION OF THE DRAWINGS

The above and further advantages may be better understood by referring to the following description in conjunction with the accompanying drawings, in which like numerals indicate like structural elements and features in various figures. The drawings are not necessarily to scale, with emphasis instead being placed upon illustrating the principles of the concepts.

DETAILED DESCRIPTION

To combat the problem of zero-day attacks or related malicious cyberattacks involving disparate IDS locations, a cooperative system may be provided that includes a plurality of IDS nodes constructed and arranged as a consortium, which can quickly react to an attack that has been detected by other participating IDS nodes in the consortium. Nevertheless, cooperative intrusion detection systems are prone to vulnerabilities which attackers may exploit to gain access to unauthorized data. In particular, major vulnerabilities may occur at a database that stores data collected by the various IDS nodes regarding attack signatures and/or features. Accordingly, attack signature or features are exposed to malicious activities including but not limited to fake data injection, data manipulation or deletion, and so on. Conventional security applications include a central computer server used as a "trusted" point to combat data sharing issues. However, security issues arise when third party computers perform this task because data processed by such computers of the IDS consortium is exposed to "man-in-the-middle" or single point-of-failure attacks.

Figure 1:
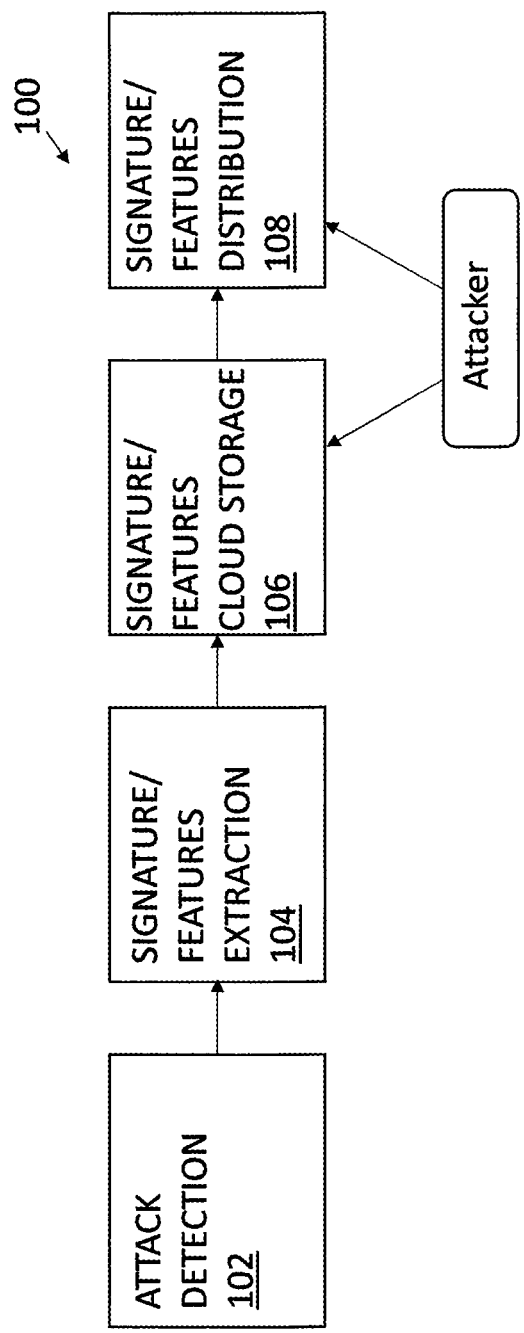
FIG. 1 is a flow diagram illustrating steps performed by a conventional intrusion detection system.

Referring to FIG. 1, a conventional cooperative IDS 100 can perform four processing steps including attack detection 102, attack signature/features extraction 104, storage 106, and distribution 108. However, step 106, which includes the storage of data related to cyberattack signatures and/or features (i.e., stored in a database or cloud computing environment) and distribution step 108, which entails the distribution of such data for notifying other IDS computers of such attacks, are particularly prone to cyberattacks. The majority of available solutions to secure these target steps 106, 108 are to either utilize a centralized approach where a predetermined IDS node coordinates activities of other nodes, which renders the network vulnerable to a single point-of-failure and man-in-the-middle attacks, or a decentralized approach which eliminates the central IDS node, but compromises the consistency and integrity of distributed data.

In brief overview, embodiments include a computer security architecture, which securely stores and distributes retrieved attack signatures and features so that cyberattack threat information can be exchanged among multiple IDS computers, or nodes, at disparate locations, for example, in a consortium or the like, and permit malicious activities to be tracked and/or prevented by the nodes in response to and/or in anticipation of intrusions of cyberattacks or the like. A cyberattack feature (distinguished from a signature) can be a characteristic of an attack, which is retrieved from attack-related traffic detected by an anomaly-based IDS. Attack signatures, on the other hand, may refer to predefined rules obtained from a signature-based IDS. In cooperative security systems, IDS nodes cooperate to exchange attack signatures or features among each other to exchange information regarding previously detected attacks on another participating member of an IDS consortium, which may be useful in detecting future attacks.

Unlike conventional centralized approaches, embodiments of the present inventive concepts include a distributed ledger technology for storing and distributing the attack signatures and features. In a distributive network, such as a blockchain network, each node receives and possesses a copy of all transactions that have occurred in the network, thereby eliminating trust among nodes and preventing single-point-of-failure and man-in-the-middle attacks, to which a centralized configuration is prone. Apart from this, the inclusion of blockchain technology according to some embodiments renders impossible any fake data injection, data manipulation or deletion. Furthermore, the inventive concepts convert cyberattacks signatures and features to a standard uniform format for compatibility purposes when processing such data at different nodes of a diverse intrusion detection system. In some embodiments, these standardized attack signatures and features are stored among the participating nodes in real-time or near real-time. In some embodiments, the systems and methods according to some embodiments provide permissionless or non-authenticating access to public nodes providing intrusion detection to join a network and retrieved stored attack signatures/features in real-time or near real-time without security concerns. Here, nodes can be added to a network in a scalable manner such that the number of nodes in the network does not have an undesirable effect on the response time of the network. Accordingly, a blockchain-based architecture incorporated by the systems and methods according to some embodiments combats security threats associated with storage and distribution of cyberattack signatures or features in cooperative intrusion detection system at least in part by eliminating data integrity and consistency issue associated with data storage and sharing in a distributed security computer environment.

In sum, the computer security architecture in accordance with some embodiments securely retrieves attack signature from any signature-based IDS and converts these signatures to a standard format which makes it compatible with nodes executing different IDS software, performed on different hardware platforms, and so on. Similarly, the architecture retrieves features from malicious activities of host-based attacks features detected by any anomaly-based IDS and presents the retrieved features in a standard format which can be read and understood by any anomaly-based IDS in real-time or near real-time. The architecture securely stores the formatted signature and features in a distributive blockchain network. Additional details of the foregoing inventive features are described herein.

Figure 2:
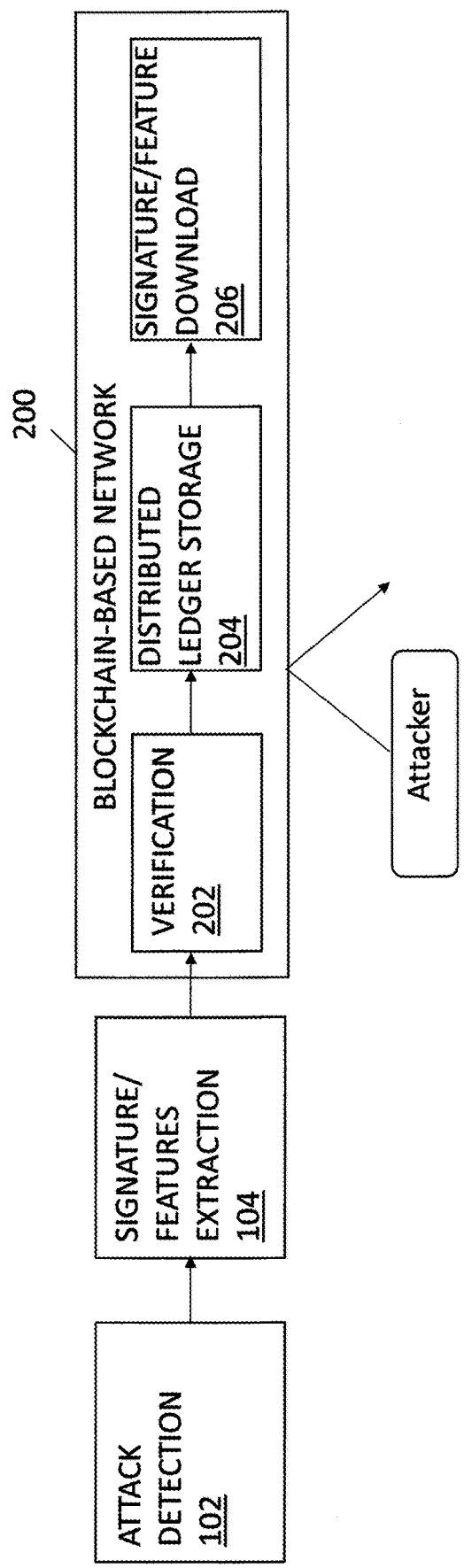
FIG. 2 is a flow diagram illustrating steps performed by an intrusion detection system, in accordance with embodiments of the present inventive concepts.

Referring to FIG. 2, a computer security network 200 configured for transmitting and executing blockchain transactions performs the foregoing by performing a sequence of verification 202, distributed ledger storage 204, and signature/feature download 206 functions. In particular, the network 200 securely retrieves attack signatures from signature-based IDS nodes and attack features from attack traffics detected by an anomaly-based IDS, converts them to standard formats, and stores and securely distribute them to other nodes in the network 200 in real-time or near real-time.

The computer security network 200 can include be a highly scalable blockchain network, for example, including a distributed ledger and smart contract platform based on Ethereum or the like, but not limited thereto. Blockchain computer processors in the network 200 can provide a public blockchain, a private blockchain, or a combination of public and private blockchains, for example, accessed by public and private keys along with relevant data such as addresses or the like.

Figure 3:
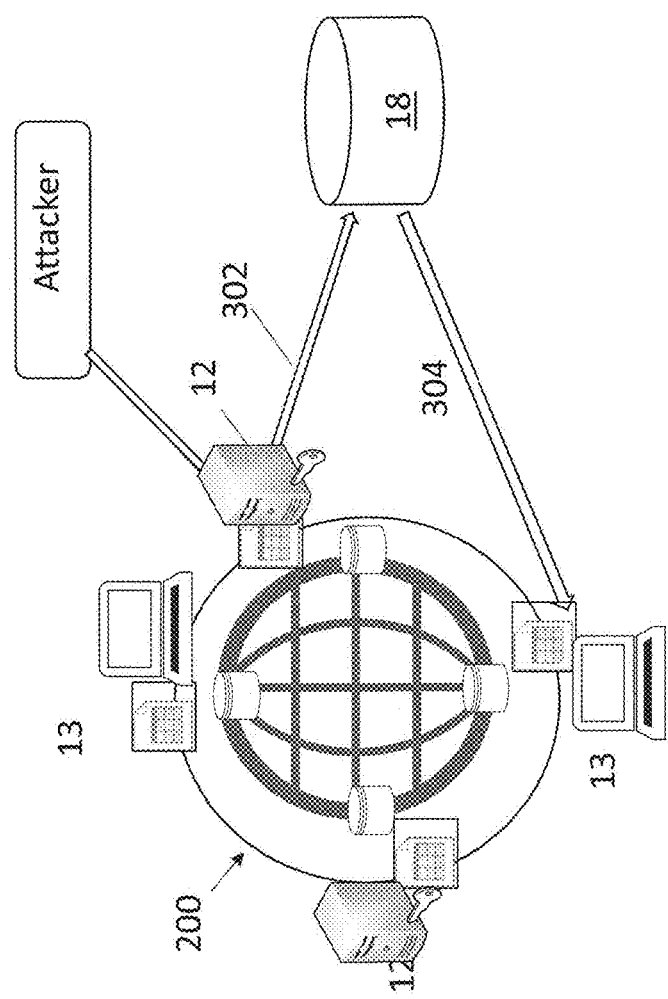
FIG. 3 illustrates a computer security architecture, in accordance with embodiments of the present inventive concepts.

Referring to FIG. 3, the computer security network 200 in accordance with embodiments of the present inventive concepts can include one or more authorized nodes 12, one or more unauthorized nodes 13, and a special-purpose database 18 in electronic communication with each other via blockchain processors of the network 200. One or more special-purpose processors of the blockchain network 200 may be included, and may be part of the authorized nodes 12, unauthorized nodes 13, or other computer hardware platforms of the blockchain network. The authorized nodes 12 (also referred to as validating nodes) are constructed and arranged to prepare, submit, and verify transactions formed by the nodes 12 to form a blockchain. These authorized nodes 12 can also execute a consensus algorithm or the like to validate and verify transactions corresponding to blocks of a formed blockchain. The consensus algorithm manages agreements among the nodes 12, 13 of the blockchain network about the current state of the distributed ledger to ensure that exchanged blockchain transactions including new blocks added to a blockchain are secured and verified.

The authorized nodes 12 are also constructed and arranged to update the database 18, permitting the data immutability and tamper-proof abilities of blockchain technology to share the database with various public electronic devices without any security concerns with respect to illicit data manipulation and deletion.

The unauthorized nodes 13 (also referred to as non-validating nodes) are public nodes, and do not require permission to join or leave the blockchain network 200. They are constructed and arranged to join the network 200 to retrieve stored cyberattack signatures or features. However, unlike the authorized nodes 12, the unauthorized nodes 13 are not privileged to prepare, verify, validate, or otherwise process a consensus algorithm, and cannot update the database 18 or contribute to the addition of new blocks to a blockchain. However, the unauthorized nodes 13 can request transaction addresses. Here, unauthorized nodes 13 monitor the copy of their blockchain ledger for updates. For example, when a determination is made that the number of blocks in the ledger increases, a script is automatically executed at the unauthorized node 13, which generates a request that is output to the database 18 for the transaction address and ABI of the new block.

The database 18 is accessible to all nodes 12, 13 for storing transaction address information regarding transactions, for example, information about a block chained to a blockchain, smart contracts and their application binary interfaces (ABIs), which includes program code for encoding/decoding data with respect to a machine code-level program module, for example, encoding smart contracts, for example, Ethereum contracts, and retrieving transactions from a blockchain. The database 18 can be a cloud-based database, SQL, or other database technology known to one of ordinary skill in the art. In some embodiments, the database 18 is a common database or distributed database. In some embodiments, each authorized node 12 has a read and write access to the database 18, and each unauthorized node 13 has read-only access to the foregoing. All information is updated by the authorized nodes 12, but not the unauthorized nodes 13. Any data manipulation in database results in inability to access contents of blockchain but does not affect data stored on the blockchain. Such malicious activity can be easily detected by one or more IDS nodes.

Figure 4:
FIG. 4 is a block diagram illustrating the fundamental steps performed by the computer security architecture of FIG. 3, in accordance with some embodiments of the present inventive concepts.

FIG. 4 is a block diagram illustrating the fundamental steps performed by the computer security architecture of FIG. 3, in accordance with some embodiments of the present inventive concepts. Accordingly, the steps described in FIG. 4 are executed by one or more hardware computers of the computer security architecture of FIG. 3.

The extraction step 402 may include two types of extraction: signature extraction and feature extraction. Signatures can be extracted from a signature-based IDS, while features can be extracted from attack traffic detected by an anomaly-based IDS. In some embodiments, signatures and features can be extracted from different nodes that utilizes different anomaly-based IDS and developed into a general standard that all nodes in the blockchain network adopt. In other embodiments, an IDS node may be part of a same computer platform that operates as both a signature-based IDS for extracting signatures and an anomaly-based IDS for extracting features.

Figure 8A:
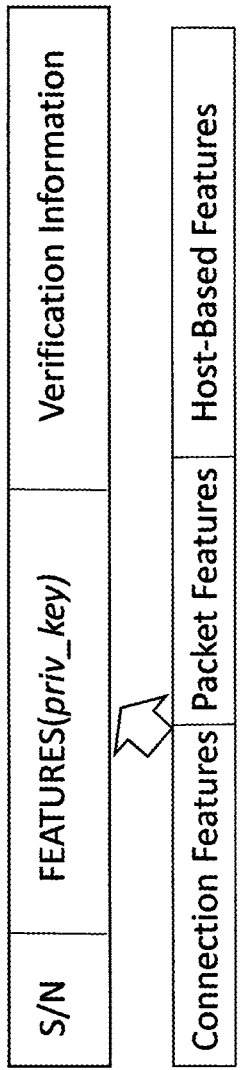
FIG. 8A illustrates a format of an electronically submitted signature by an authorized blockchain node, in accordance with some embodiments of the present inventive concepts.
Figure 8B:
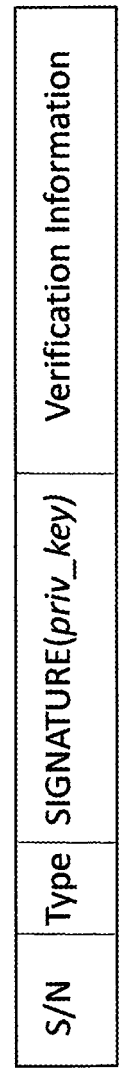
FIG. 8B illustrates a format of a transaction prepared using predetermined features, in accordance with some embodiments of the present inventive concepts.8A

With regard to a signature extraction type, signatures are predefined rules used to detect known attacks (i.e. attacks which has occurred in the past). A signature-based IDS utilizes predefined rules for attack detection, e.g. Snort, Bro, Suricata, etc. A signature-based IDS cannot detect zero-day attacks, i.e., cyberattacks for which there is no existing signature, but can nevertheless detect known attacks with up to 100% accuracy. In the computer security architecture shown in FIGS. 2 and 3, authorized nodes 12 are privileged to submit a transaction, hence, signatures are extracted by authorized nodes 12 only. When an attack is detected, the signature that detects the attack is retrieved from the authorized node 12. The owner prepares a transaction, signs with the owner's private key and submits it to the blockchain network 200 for verification. In addition to the transaction, the owner also submits other verification information, e.g. Transaction Account, MAC address, etc. An example format of an electronically submitted signature by an authorized node 12 is shown in FIG. 8B which may include a record or the like that includes fields for serial number, type, signature by private key, and verification data.

With regard to a feature extraction type, in network-based attacks, attack features are characteristics of attack traffic that distinguishes it from "normal" traffic. Anomaly-based IDS computers can detect a malicious intruder since attack traffic differs from normal traffic. Anomaly based IDSs extract features from normal traffic to train their IDS computers, then raise alert whenever there is a deviation from known traffic pattern. In host-based attacks, attack features are characteristics of the attacks that reside in the computing environment including one or more computer machines.

These attacks access resources in a computer machine when software applications are executed. Unlike network-based cyberattacks, host-based attacks focused on operating system and applications installed on the machine. Anomaly-based IDS computers can detect both network and host-based attacks. Although accuracies of anomaly-based IDS computers are not as high as a signature-based IDS computer, they possess the capabilities of detecting zero-day attacks. In the architecture described in the embodiments of FIG. 3, features of both network-based and host-based attacks can be extracted in step 402. These attack features can be classified into discrete and continuous features. While discrete features are features that takes only one value, continuous features can take different values, required in attack classification.

For computer network attacks, features can be extracted under two categories: connection features and packet features. Connection features refer to attack features that are obtained from attack traffic connections. When an attack is detected, attack traffic can be sniffed by a network traffic analyzer, then captured whereby network connections are analyzed. Features extracted may be categorized as one of continuous or discrete features. For example, a source port or IP address (where attack is launched) or destination or target port or IP address can be identified as features of a discrete connection type. Source byte (total number of bytes sent from attack nodes during an attack period), destination byte (total number of bytes sent from target network to attack nodes during an attack period), duration (total time elapsed during attack period), throughput (rate at which attack nodes sends bytes to target node), service account (total number of connections to the same port number within attack period), host rate (percentage of attack nodes attacking the same target in target network during attack period), and so on may be identified as features of a continuous feature type.

Packet features refer to attack features obtained by sniffing and analyzing attack packets. Here, attack packets can be sniffed, captured, decoded and analyzed using packet sniffing tools. Attack packet features can likewise be categorized as continuous or discrete features. Discrete features can include, for example, a land field where a '1' is established if the source and destination IP are the same and ports are same, else, it is '0'. Other discrete features can include type of service (defines class of traffic assigned to attack packet), protocol (states higher layer protocol used in data portion of packet), flags (explains how a packet should be routed by router or processed by higher layer protocol), and so on. An example of a continuous feature here can include an urgent field, which indicates priority of handling packets by the router. If set to '1'; it needs to be sent out as fast as possible else, handles same way as others.

Figure 8C:
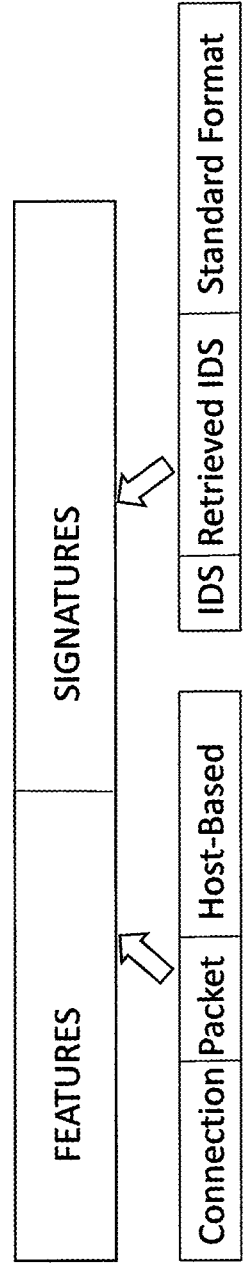
FIG. 8C illustrates a format of a mined transaction, in accordance with some embodiments of the present inventive concepts.

Other features may include Host-Based features, which are extracted from attacks that reside in the computing nodes. These attacks access resources and information in the computer system. Host-based attack features are extracted by monitoring and gathering information about unusual activities of part of all dynamic behavior of a computer system or host. We developed a script that monitor unusual activities in a host and extract features based on these activities. Part of these activities are; key-logger features, package installation features, permission features, call graph features, processor path features etc. When an attack is detected, malicious activities in the host are sniffed, captures and analyzed using script. Examples of features extracted from host-based attacks may include continuous and/or discrete features such as the number of applications running at background, loading time (time to load an application), number of login attempts, number of operations on access control files, number of shell scripts, and so on. A transaction is prepared using the foregoing example features according to a predetermined record format, for example, shown in FIG. 8C. For example, the transaction (attack features) is signed by the sender using its private key, then submitted for verification. For example, each transaction in the blockchain ledger is verified by consensus or an agreement among the authorized nodes 12. An owner can also submit verification information alongside a transaction as shown in FIG. 8C.

Figure 5:
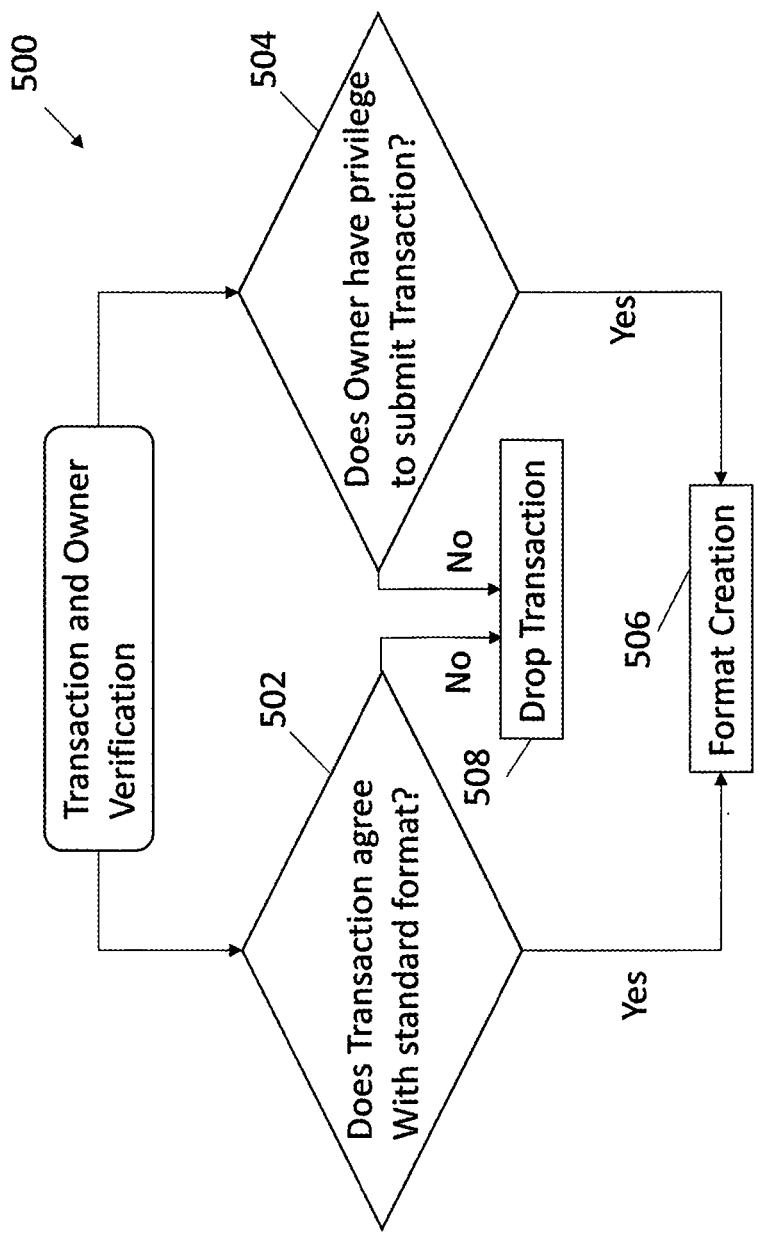
FIG. 5 is a flow diagram of a verification process, in accordance with some embodiments of the present inventive concepts.

Referring again to the computer security architecture of FIGS. 3 and 4, in the storage step 404, a submitted transaction, i.e. signatures or features, is mined to the blockchain network 200 by other authorized nodes 12. Mining is the process of storing a block containing transaction to the blockchain network 200. Before any transaction is mined, the transaction is first verified and converted to standard format. In some embodiments, the storage stage 404 is divided into three categories: (i) a verification of the transaction and owner, (ii) a conversion of the transaction to standard format, and (iii) a validation of the transaction, i.e. chaining a transaction block to a blockchain. All verification and conversion processes are configured by a smart contract, while a validation process is executed according to a blockchain consensus protocol. The accepted format of a submitted signature, for example shown in FIG. 8B, and features, for example shown in FIG. 8A. Verification information of all authorized nodes 12, standard format creation script (see FIG. 6) and signature format creation script (see FIG. 7) are written as smart contract and mine to the blockchain network. In some embodiments, the feature extraction scripts are executed by one or more authorized nodes 12. In some embodiments, a smart contract executes the following functions:

As shown in the verification algorithm 500 in FIG. 5, in accordance with some embodiments, transaction and owner verifications are performed to ensure that no unauthorized nodes 13 submit transaction. In the computer security architecture of FIGS. 3 and 4, a smart contract verifies the privilege of any nodes that submit transaction and the format of any transaction submitted. The verification algorithm 500 describes how smart contract handles verifications. For a transaction verification to return success and push to format creation (506), at decision diamond 502 the transaction must agree with standard formats (e.g., shown in FIGS. 8A and 8B). At decision diamond 504 the transaction owner must have a privilege to submit a transaction, i.e. the owner must be one of the authorized nodes 12. If any of the foregoing fails, verification algorithm 500 returns failed, and the attempted transaction is dropped (508).

Figure 6:
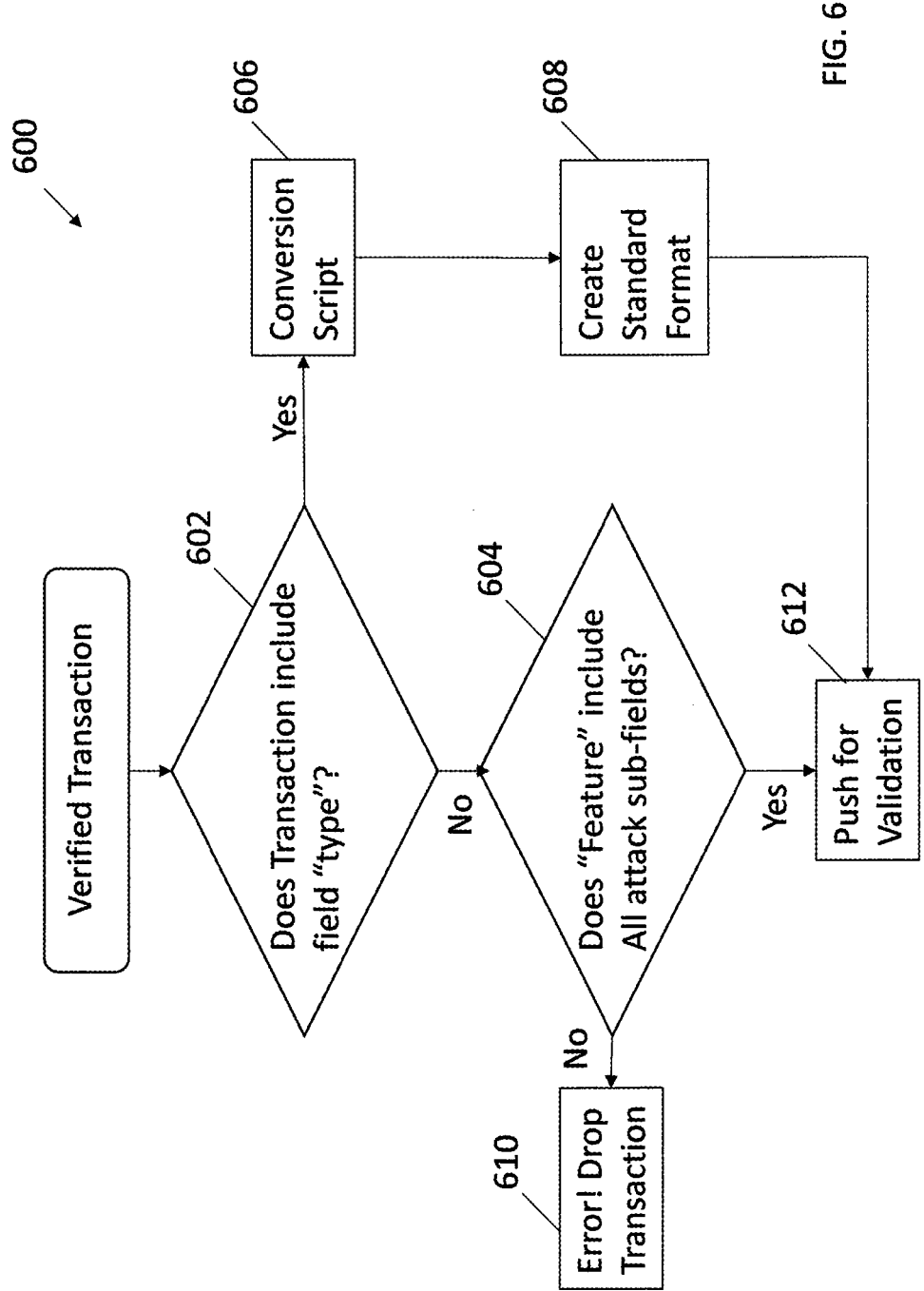
FIG. 6 is a flow diagram of a smart contract conversion process, in accordance with some embodiments of the present inventive concepts.

A feature of the inventive concept includes format creation, for example, shown in the flow diagram 600 of FIG. 6 which illustrates an algorithm that describes how smart contract converts attack signatures to a standard format. The smart contract checks for the 'type' field in submitted transaction. If there is not a type field (602), the transaction is determined to include at least one attack feature. If yes, then the process 600 at block 606 executes a conversion script and block 608 re-arranges to a standard format. If at decision diamond 602 the type field is determined to be present, the signature is pushed to conversion script (606), which is then pushed for validation (612) after the standard format is created. An example of a format of the transaction submitted for validation for both features and signatures is shown in FIG. 8C. For transactions containing an attack signature, a script is developed at block 606 that convert signatures from one IDS to a common format compatible with other IDSs (see flow diagram 700 of FIG. 7). The script can be mined to the blockchain through a smart contract.

At decision diamond 602, if there is no type field, the process 600 proceeds to decision diamond 604 where the algorithm check for all subfields in the "Features" field. If any feature subfield is missing, the process 600 proceeds to block 610, which returns an error, then drops transaction. Otherwise, at block 612, the transaction is pushed to a validation stage.

Figure 7:
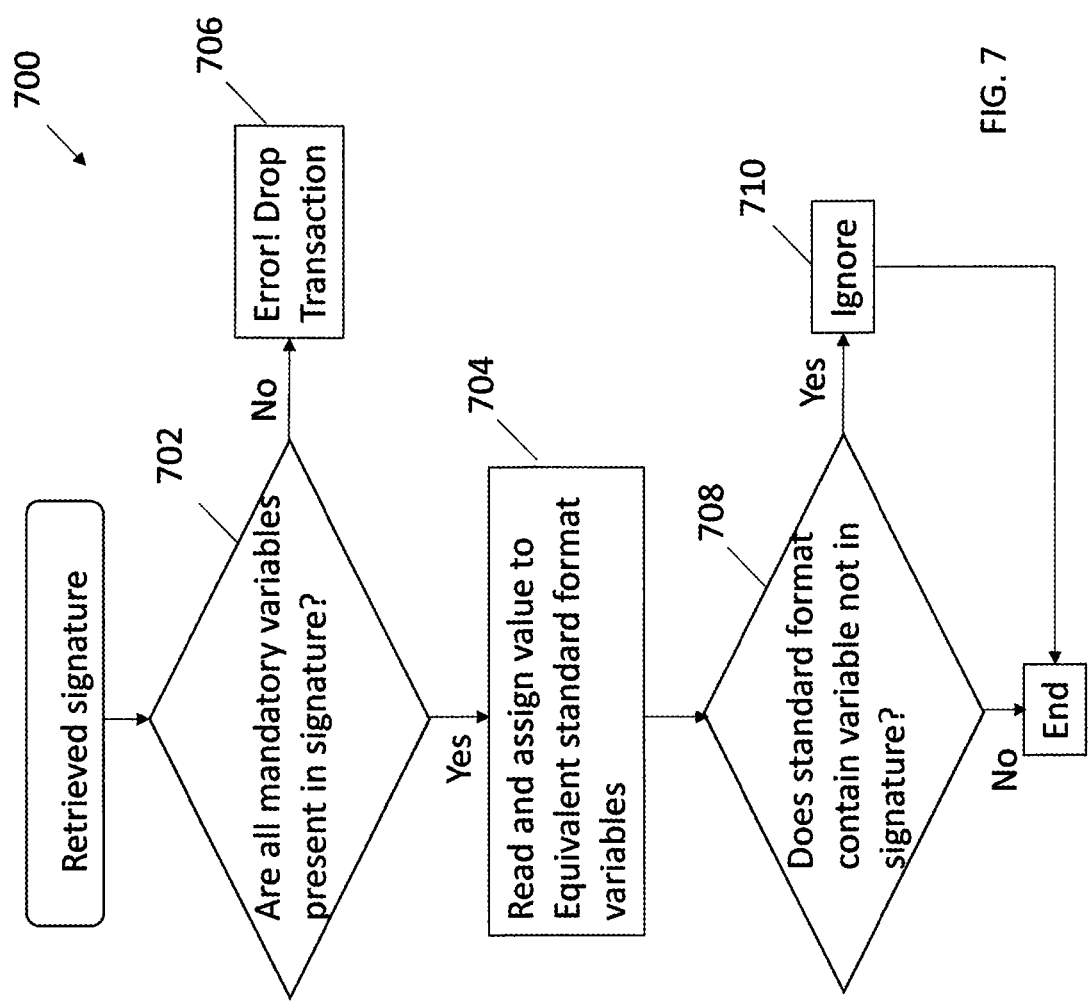
FIG. 7 is a flow diagram of a signature conversion process, in accordance with some embodiments of the present inventive concepts.

FIG. 7 describes a process 700 including the conversion of a signature to a standard format. At decision diamond 702, the variables of retrieved signature are checked for mandatory variables. If any of the mandatory variables are absent, the process 700 proceeds to block 706 wherein a computer-executed script returns an error and the signature is dropped. Otherwise, the process 700 proceeds to block 704, where the script reads the values and assigns them to corresponding standard format variables. Due to different ways of writing rules, the process 700 ignores any standard format variables without equivalent values from the retrieving signature. At decision diamond 708, a determination is made whether the standard format contains a variable not in the signature. If yes, then at block 710, it is ignored.

In addition to transaction and owner verifications (FIG. 5) and format creation (FIG. 6), embodiments of a smart contract can perform a transaction validation operation. Here, a pending transaction is built into a block by an authorized node 12 after successfully converted to standard format. The block is broadcasted into the blockchain network 200 for validation. Every node 12, 13 receives the broadcasted block, but only authorized nodes 12 (referred to as miners) validate the block. Each block contains a unique code called a hash; it also contains hash of previous block. Data from previous blocks are encrypted or hashed into a series of numbers and letters. This is performed by processing the block input through a mathematical function, which produces an output of a fixed length. The function used to generate the hash is deterministic in that it produces the same result each time the same input is used. Accordingly, the foregoing renders determining the input difficult and executes small changes to the input result in a very different hash.

To validate the block, authorized nodes 12 operate to retrieve a target hash. A target hash is a number that a hashed block header must be less than or equal to for a new block to be awarded. This is achieved by using an iterative process. The architecture in FIGS. 2-4 is compatible with any consensus algorithm, e.g. proof-of-work, proof-of-stake, delegated proof-of-stake, byzantine fault tolerance, delegated byzantine fault tolerance, proof-of-authority, proof-of-burn, proof-of-capacity, etc. In some embodiments, a consensus algorithm is executed by the blockchain network 200, for example, an Ethereum blockchain platform of the network 200. The process of guessing a hash starts in the block header, which in some embodiments, includes a block version number, a timestamp, the hash used in the previous block, the hash of Merkle Root, the nonce, and the target hash. Successfully mining a block requires an authorized node 12 to be the first to guess the nonce, which is a random string of numbers and broadcast to other nodes. Other authorized nodes 12 verify the correctness of the nonce value by appending this number to the hashed contents of the block, and then rehash it. If the new hash meets the requirements set forth in the target, then the block is added to the blockchain. The transaction is said to be permanently stored, on the blockchain network 200. Accordingly, it is impossible to mutate or erase the block.

Referring again to the computer security architecture of FIGS. 2-4, in the distribution step 406, when the block containing new transaction has been successfully attached to the bloc chain network, the transaction address of block is issued to transaction owner (sender) The blockchain network 200 updates its ledger with the new additional block and the transaction is ready to be retrieved. The following steps are involved in the distribution of a stored transaction.

After every successful chaining of new blocks to the blockchain network, a first step may include the blockchain network 200 updating its ledgers. The current state (i.e. new block) of the blockchain network 200 is reflected on the ledger of every blockchain node. Every node (authorized 12 and unauthorized 13) in the blockchain network 200 has a copy of the new update. Transaction address and Application Binary Interface (ABI) data are output to the database 18 by an owner as shown in data path 302 of FIG. 3. The database 18 is made public so that every node can have access to the information and retrieve the content of the blockchain.

A second step of the distribution of a stored transaction may include signature/feature downloading. Although every node has a copy of a new update (i.e. new block), the nodes are unable to view the content of the added block. Both authorized 12 and unauthorized 13 nodes need to obtain the content of the new update. To download new updates, shown in data path 304 of FIG. 2 3, blockchain nodes can request transaction address and ABI of that block from public database. The retrieved information from database are used to query the blockchain and download new updates (i.e. attack signatures or features). Nodes extract standard formatted signatures from the downloaded transaction or retrieved attack features depending on type of IDS used.

Figure 9:
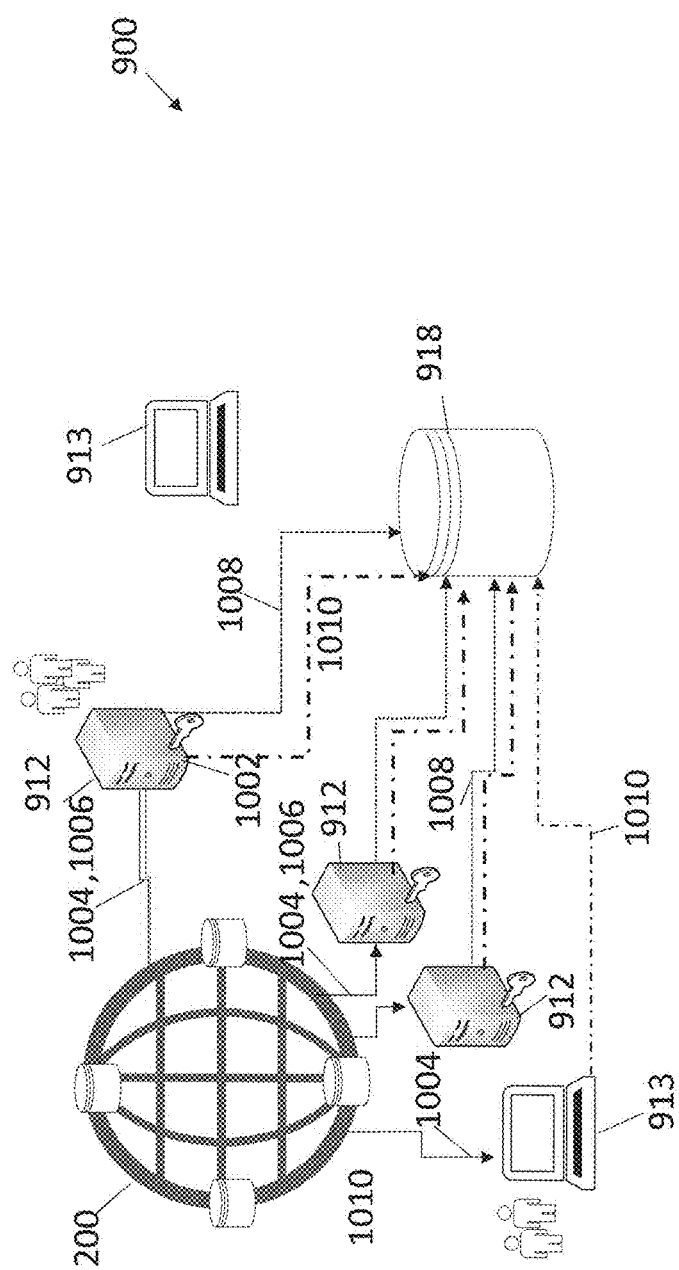
FIG. 9 illustrates a computer security architecture, in accordance with other embodiments of the present inventive concepts.
Figure 10:
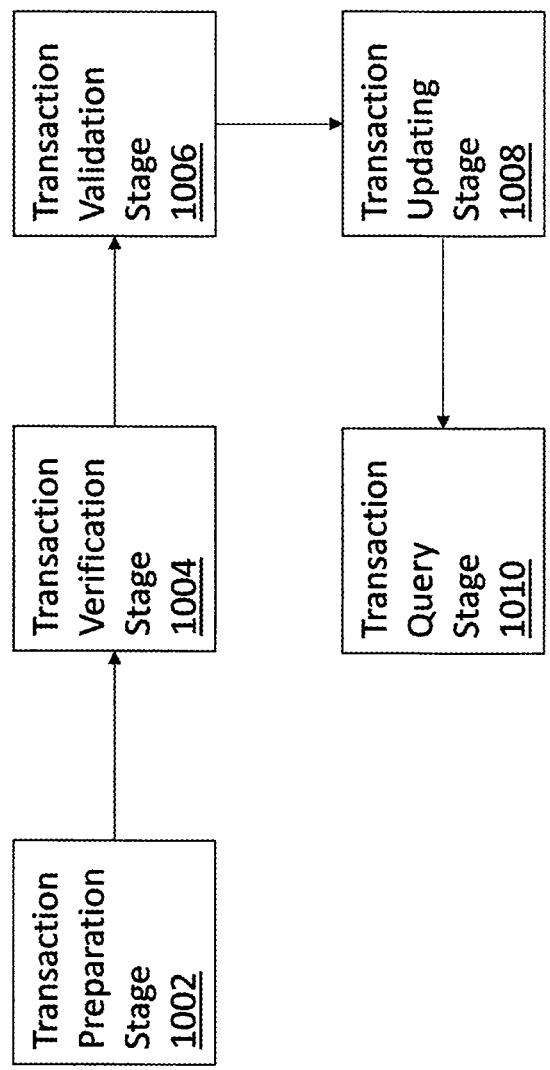
FIG. 10 is a flow diagram illustrating the fundamental steps performed by the computer security architecture of FIG. 9, in accordance with other embodiments of the present inventive concepts.

FIG. 9 illustrates a computer security architecture 900, in accordance with other embodiments of the present inventive concepts. FIG. 10 is a flow diagram illustrating the fundamental steps performed by the computer security architecture 900 of FIG. 9, in accordance with other embodiments of the present inventive concepts.

The computer security architecture 900 can include one or more validating nodes 912, one or more non-validating nodes 913, and a special-purpose database 918 in electronic communication with each other via a blockchain network, which may be similar to or the same as the blockchain network 200 of FIGS. 2-8. The validating nodes 912, non-validating nodes 913, and special-purpose database 918 can share similar features and functions as those described in FIGS. 2-8. For example, each validating node 912 can represent a company or portion of a company having an IDS capable of detecting zero-day attacks and execute a consensus algorithm, and therefore validate transactions. The non-validating nodes 913 can represent companies that have an anomaly-based and/or signature-based IDS, and can be public nodes that are not involved in the preparation, submission, verification, running consensus algorithm and validation of transactions, but capable of querying published blocks to download the contents for their uses.

As shown in FIG. 10, the computer security architecture 900 can include five stages, namely, transaction preparation 1002, verification 1004, validation 1006, updating 1008, and query 1010 stages.

The transaction preparation stage 1002 can be carried out by the validating nodes 912. After the attack has been detected using any type of intrusion detection systems e.g. DCA, NSA or any other IDS. The validating nodes 912 extract the features used to detect the attack. These features are developed into a standard format based on the consensus of the validating nodes. These features (in standardized format) are developed into code and then compiled using any convenient java language compatible with blockchain e.g. Solidity, Go language etc. The transaction is signed by the sender using its private key and then submitted to the network for transaction verification (step 1004). In the transaction verification stage 1004, the information signed and sent by the compiling node 912 is received by every node 912, 913 in the blockchain network. In some embodiments, only the validating nodes 912 verify the information. This involves verifying the validity of the transaction submitted. i.e., verifying that the transaction is in accordance with the agreed standard. Since not every node has the privilege to submit a transaction, the privilege of the node submitting a transaction is also verified using its public key, IP address, MAC address, location etc. Also, the submitted transaction is also verified to check if similar transaction has been submitted before.

In the transaction validation stage 1006, the pending transaction from the transaction verification stage is built into a blockchain block by any of the validating nodes 912 after verification stage 1004 is successful. The block is broadcasted into the network for validation. Other validating nodes 912 receive the broadcasted block and work to validate it through an iterative process which requires consensus from a majority of the validating nodes. This can be achieved by using consensus algorithm which is an algorithm that help a distributed or centralized network to unanimously take a decision whenever necessary. Its features include assuring decentralized governance, quorum structure, authentication, integrity, non-repudiation, byzantine fault performance and tolerance. Thus, the consensus protocol, e.g., proof-of-work, proof-of-stake, delegated proof-of-stake, byzantine fault tolerance, delegated byzantine fault tolerance, proof-of-authority, proof-of-burn, proof-of-capacity etc, is configured to avoid malfunctioning of the blockchain architecture.

In the transaction updating stage 1008, when all transactions have been validated, the new block is attached to the blockchain, and the current state of the ledger is broadcasted to the network. Every node (both validating 912 and non-validating 913 nodes) in the blockchain network 200 receives a copy of this update. The transaction address is issued to the transaction owner (sender). The address and Application Binary Interface (ABI) are sent by the owner to a database manager so that everyone can have access to the transaction. The database manager holding the transaction address and ABI could be SQL, APACHE, cloud-computing, and so on.

The transaction querying stage 1010 can be carried out by all nodes connected to the blockchain network (both validating 912 and non-validating 913 nodes). The blockchain has been updated with the new transaction and a copy of the update has been received by all nodes in the network but they cannot access the content of the new block. To interact with a mined block and download its contents, the transaction address and ABI of that transaction are needed. These are requested from database manager by the non-validating nodes 913. The information retrieved from the database manager are used to download the content of that block. The attack features extracted are used as signatures in their local IDS e.g. Snort, to detect such attacks.

FIGS. 11-18 include various graphs illustrating performance metrics produced when a computer security architecture is implemented according to one or more embodiments herein.

The performance metrics, for example, can be generated by the computer security architecture, at least some of which is implemented on a Ethereum blockchain platform, but not limited thereto. Smart contracts may be implemented using an object-oriented, high-level language, for example, Solidity, but not limited thereto. The environment in which the performance metrics were produced includes four authorized nodes and one unauthorized node but not limited thereto. The authorized nodes were configured to include a transaction account, at which MAC and IP addresses and coded into a smart contract and mined to the blockchain network. A signature-based IDS is implemented on the blockchain nodes. A variety connection, packet and host analyzing scripts can be executed on all authorized nodes. Verification information of all authorized nodes can be written as a smart contract and mined into the blockchain network. In cooperative intrusion detection, time taken to disseminate information and security of data sharing are very crucial, while ensuring that the shared data are secured.

The computer security architecture in accordance with some embodiments is tested against fake data injection or the like. An unauthorized node prepares a transaction and submit to the blockchain. All other authorized nodes work to validate this transaction. It is observed that the transaction address is not issued to the sender. This implies that transaction is not validated (i.e. transaction is not chained to the blockchain). Transaction address and ABI of transaction can be generated, then executed to query the blockchain. In some experiments including the foregoing configuration, it was observed that the blockchain did not return any transaction. This is because no transaction with such address is mined to the blockchain network. This shows that the architecture protects against any malicious data injection.

Furthermore, the performance of the architecture was evaluated using latency and scalability. The following parameters were collected for each transaction: Transaction deployment time ($t1$): This is time each transaction is submitted to the network. These data are collected directly from console of the transaction sender Execution time ($t3$): This is time taken for the content of each transaction to appears in designated files (IDS rule files) of each node. These data are retrieved by setting on current time for all nodes.

The latency, or response time (measured in seconds) of the blockchain network, for every transaction, is defined as the difference between the execution time and deployment time ($t_3-t_1$). Latency includes verification time, signature conversion time, mining time and time taken for nodes to send signatures to their IDS rule files. The architecture converts any attack signatures to a standard format. For this experiment, a Denial of Service (DoS) attack is used. DoS attack rule was set at a local rules file of an authorized and set in a monitoring mode. The following is an example of a DoS attack signature used in the experiment:

DoS attack signature: alert tcp !$HOME_NET any → $HOME_NET 80 (flags: S; msg:"Possible DoS"; flow: stateless; threshold: type both, track by_src, count 70, seconds 10; sid:10001; rev:1)

A DoS attack was launched at an authorized node from an attack node. The authorized node detected the attack, retrieved the signature and submitted it as a transaction to the blockchain network. The attack was converted to a standard format in accordance with embodiments herein.

Three other authorized nodes verified and mined transactions to the blockchain. This is repeated at least ten more times. The following table shows the standard format of a retrieved signature.

| Standard Format Variable | Signature Values |
|---|---|
| Action | Alert |
| Protocol | tcp |
| Source IP | HOME_NET |
| Source port | Any |
| Destination IP | HOME_NET |
| Destination port | 80 |
| Flags | S |
| Message | Possible DoS |
| flow | Stateless |
| Threshold | src |
| Packets/sec | 70 |
| Time (seconds) | 10 |
| sid | 10001 |
| rev | 1 |

Figure 11:
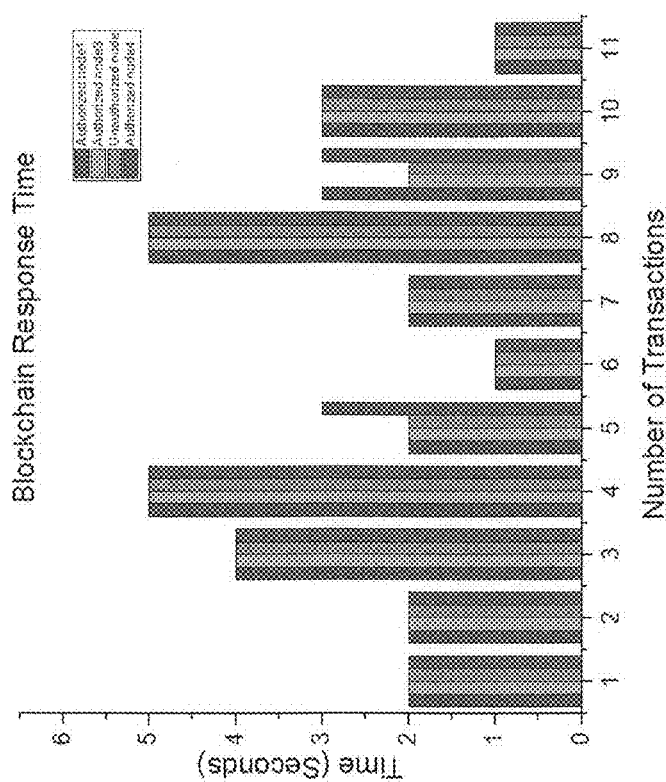
FIG. 11 is a graph illustrating examples of response time in a blockchain network, in accordance with other embodiments of the present inventive concepts.
Figure 12:
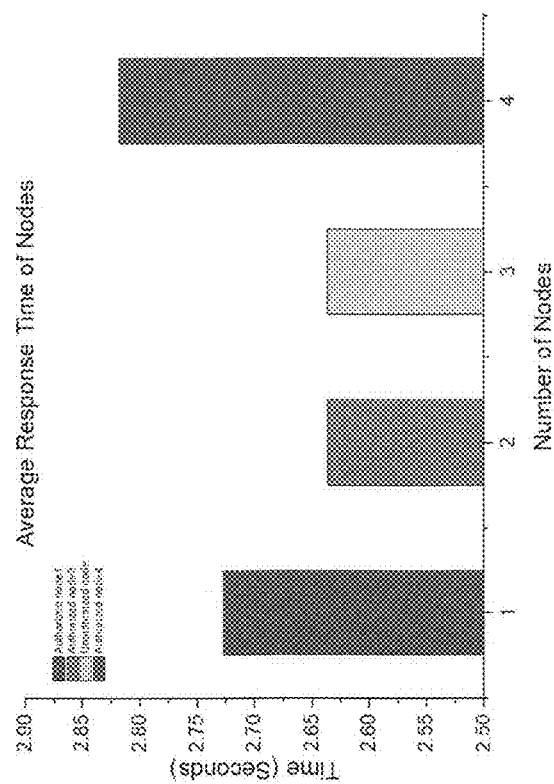
FIG. 12 is a graph illustrating examples of an average response of each node in a blockchain network when a transaction is retrieved from the network.

FIG. 11 illustrates the response time of each node for every transaction, in particular, the response time of the blockchain from when transaction is submitted to when it is retrieved. It is observed that a latency of a 6th transaction is smallest while the $4^{th}$ and $8^{th}$ transaction have highest latencies for all nodes. The transaction validation time has major impact on latency of the network, i.e. the higher the validation time, the higher the latency. FIG. 12 shows the average response time of each node when a transaction is retrieved from the network. For each node, the average response time is addition of all response times for all transaction divided by number of transactions. It is observed that average response time for all nodes is less than 3 seconds.

The blockchain network is set up in the laboratory as described above, for example, shown in FIG. 3. Experimental data includes an authorized node that executes a negative selection algorithm (NSA) anomaly-based IDS which has been trained using normal network traffic. DoS attack was launched at the authorized node. When this attack is detected, a set of sniffing scripts capture traffic, then, extract all necessary features. This is prepared and submitted to the blockchain network as a transaction. Three other authorized nodes verify and mine the transactions to the blockchain. Furthermore, some attacks e.g. port scanning and land attacks are launched at the authorized node. These attacks are detected, and features are extracted. Each process is repeated 20 more times. The following table shows some of the features extracted from DoS, Port Scanning and land attacks.

| S/N | FEATURES | DoS | Port Scanning | Land |
|---|---|---|---|---|
| 1 | No of connections | 6594 | 8 | 11 |
| 2 | Source bytes(kbytes) | 1147008 | 708 | 846 |
| 3 | Source frames | 6592 | 10 | 9 |
| 4 | Source throughput(kbps) | 1698.4 | 216.1 | 917.96 |
| 5 | Source frame/second | 9995.4 | 3125.0 | 9999.99 |
| 6 | Destination bytes(kbytes) | 355968 | 364 | 0 |
| 7 | Destination frames | 6592 | 6 | 0 |
| 8 | Destination throughput(kbps) | 527.1 | 111.08 | 0 |
| 9 | Destination frame/second | 9995.4 | 1875.0 | 0 |
| 10 | Duration(seconds) | 0.65 | 0.0032 | 0.009 |
| 11 | Source diff. host rate | 0% | 16% | 11% |
| 12 | Source same host rate | 100% | 84% | 89% |
| 13 | Source diff. service rate | 99% | 100% | 11% |
| 14 | Source same service rate | 1% | 0 | 89% |
| 15 | Source diff. host count | 1 | 1 | 1 |
| 16 | Source count | 6583 | 6 | 1 |
| 17 | Destination diff. host count | 1 | 1 | 1 |
| 18 | Destination service count | 1 | 3 | 1 |
| 19 | Source IP | 192.168.0.144 | 192.168.0.144 | 192.168.0.161 |
| 20 | Source port | 8131 | 48314 | 80 |
| 21 | Destination IP | 192.168.0.161 | 192.168.0.161 | 192.168.0.161 |
| 22 | Destination port | 21 | 22 | 80 |
| 23 | Protocol | TCP | TCP | TCP |
| 24 | Type of service | 0 | 0 | 0 |
| 25 | Time to live | 64 | 64 | 64 |
| 26 | TCP flags | SYN | SYN | SYN |
| 27 | IP flags | RES | DF | RES |
| 28 | Urgent | 0 | 0 | 0 |
| 29 | Fragment | 0 | 0 | 0 |
| 30 | Land | 0 | 0 | 1 |
| 31 | Checksum | Correct | Correct | Correct |
| 32 | Wrong fragment | 0 | 0 | 0 |

Figure 13:
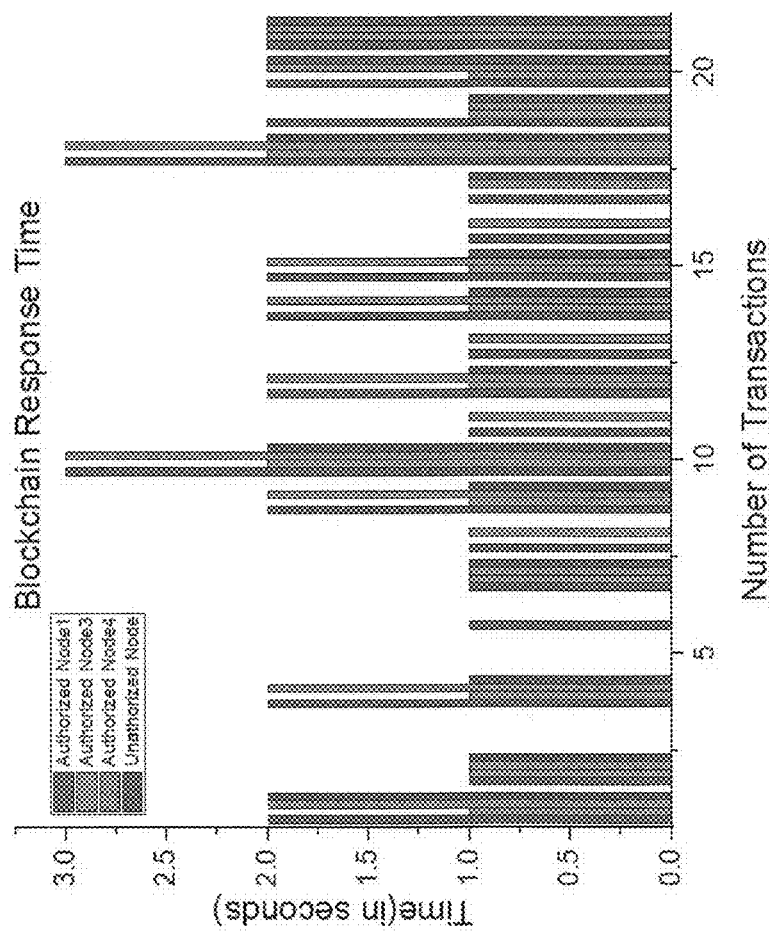
FIG. 13 is a graph illustrating examples of response times for each node in a blockchain network for a plurality of transactions in a denial-of-service (DoS) attack.
Figure 14:
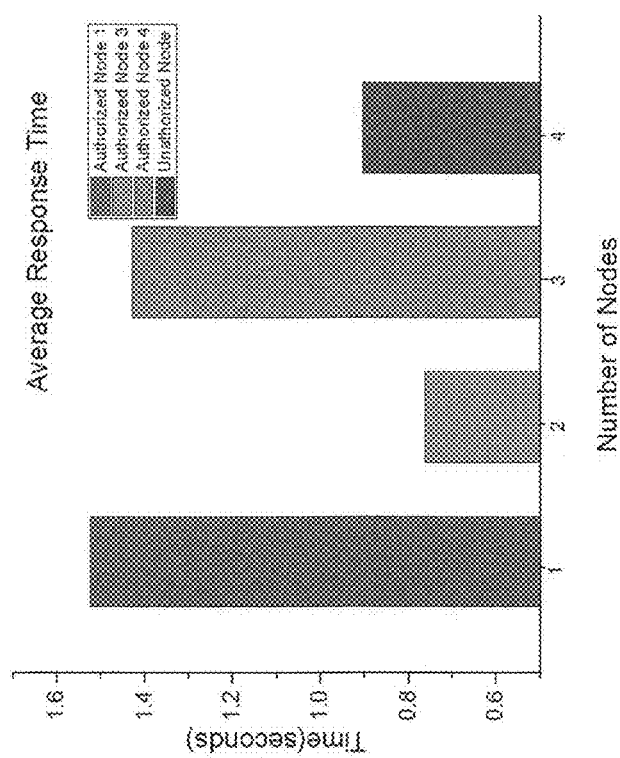
FIG. 14 is a graph illustrating an average response time of each node in the example of FIG. 13.
Figure 15A:
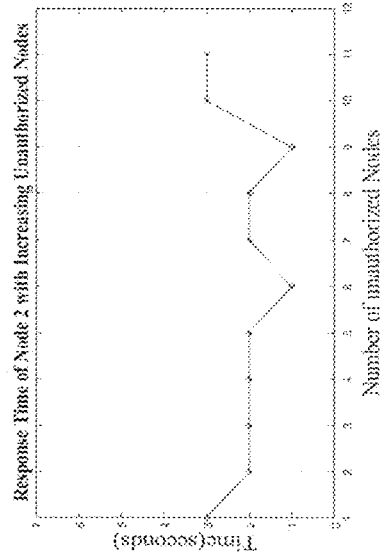
FIGS. 15A-15D, 16A-16D, 17A-17D, and 18A-18D are graphs illustrating a response time of various nodes of a blockchain network, in accordance with some embodiment of the present inventive concepts.
Figure 15B:
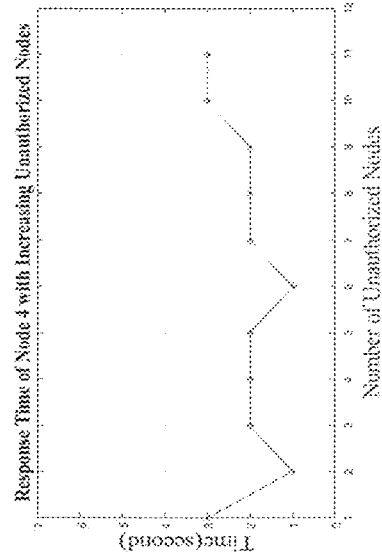
Figure 15C:
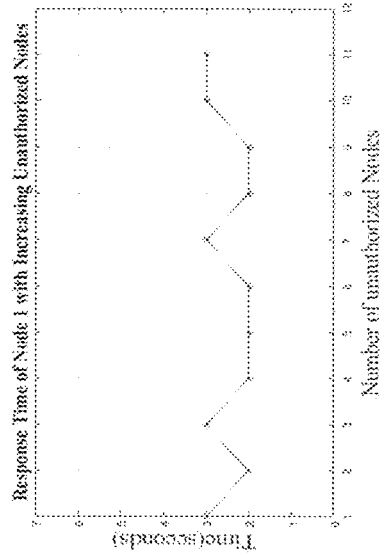
Figure 15D:
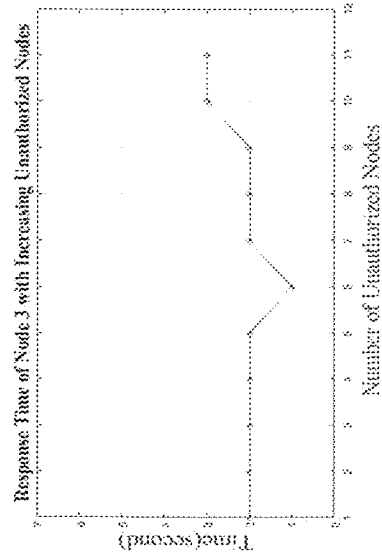
Figure 16A:
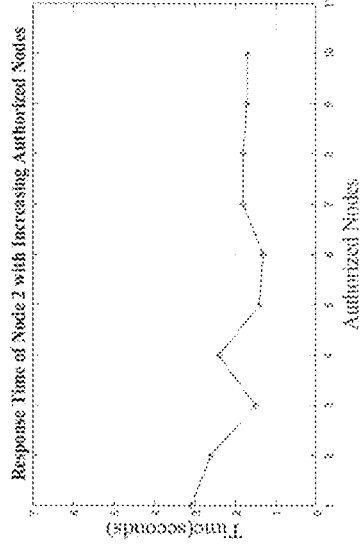
Figure 16C:
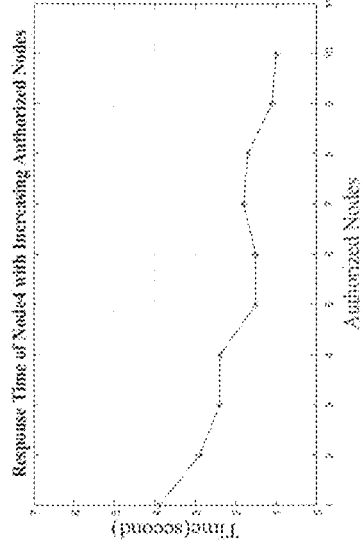
Figure 16B:
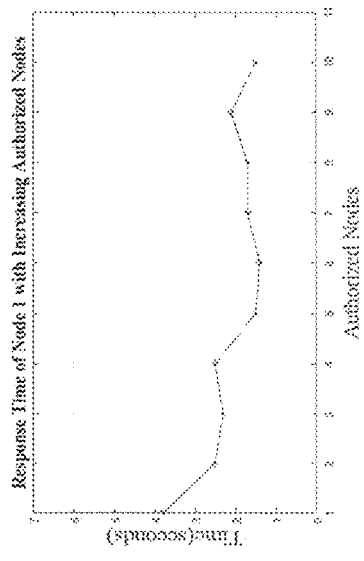
Figure 16D:
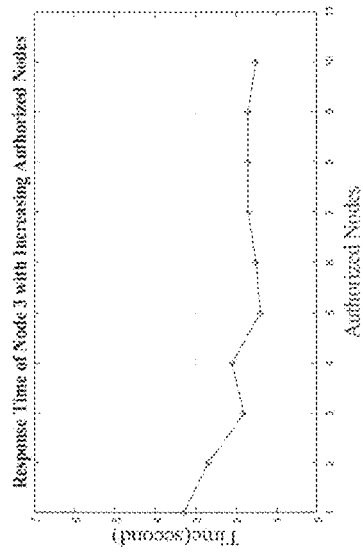
Figure 17A:
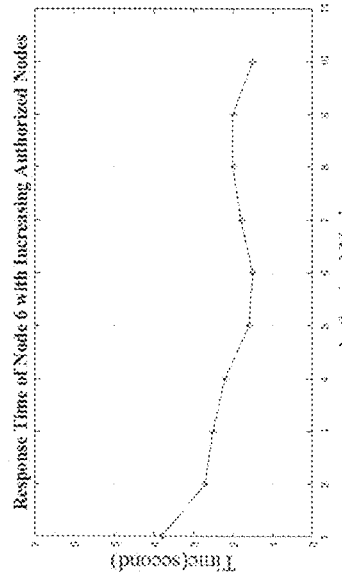
Figure 17B:
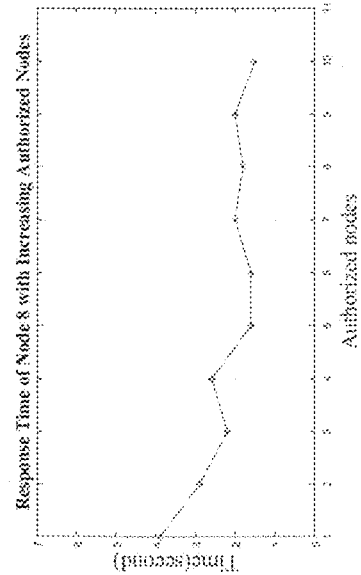
Figure 17C:
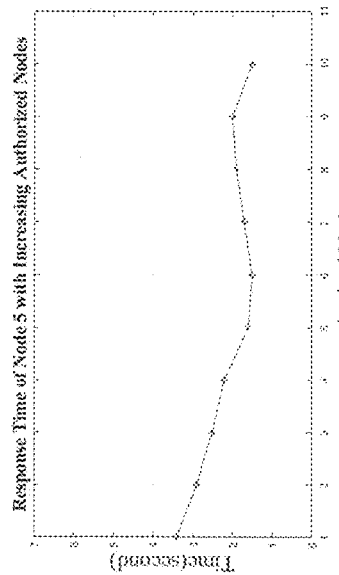
Figure 17D:
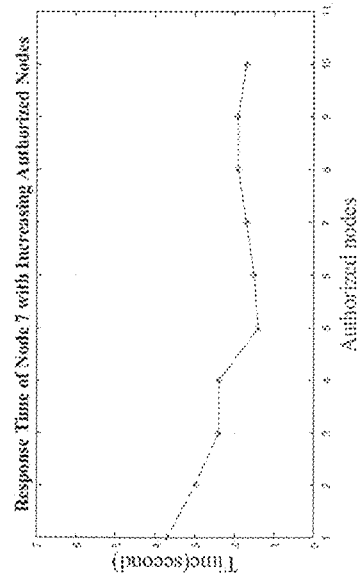
Figure 18A:
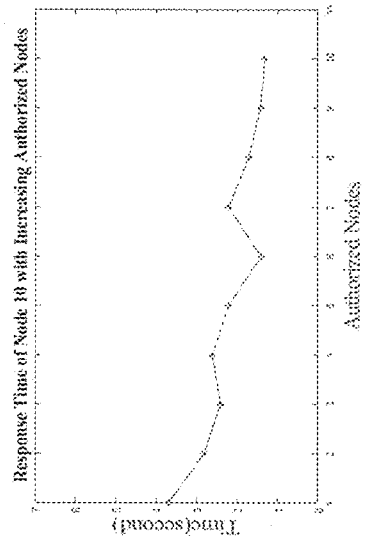
Figure 18C:
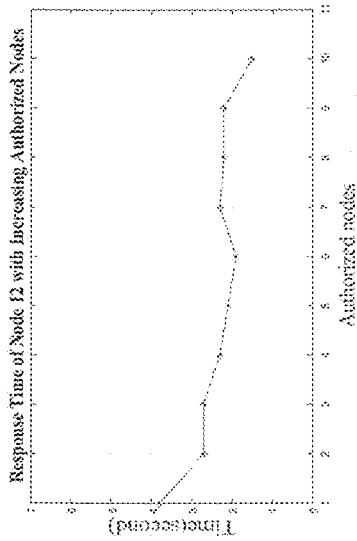
Figure 18B:
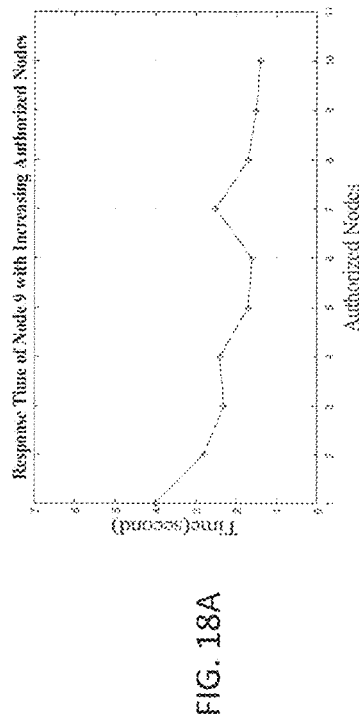
Figure 18D:
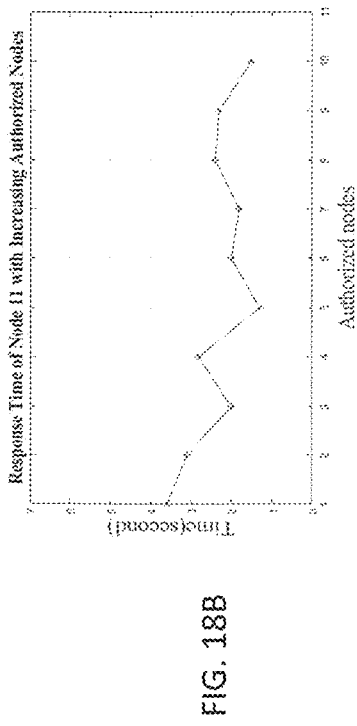

FIG. 13 shows response time of each node for 20 transactions in the DoS attack. It is observed that latency of 3rd transaction is the smallest for all nodes while $10^{th}$ and $18^{th}$ transactions have highest latencies for all nodes. FIG. 14 shows an average response time of each node. It can be seen that average response time for all nodes is less than 1.6 seconds which is considerably small.

Experimental data also includes scalability analysis. This is defined as the behavior of the blockchain network with increasing number of nodes. For the proof-of-concept, we first examine the effect of increasing unauthorized nodes on the response time. To do this, blockchain network is configured with 12 nodes in the lab and 3 authorized nodes validate transactions. An authorized node prepares a transaction and submit for validation. Three other authorized nodes validate this transaction and it is distributed to every node in the blockchain network. We add one unauthorized node at a time to the blockchain network, repeat the experiment and then, observed the response time. Here, we evaluate the response time of the architecture with increasing number of unauthorized nodes that join the network. FIGS. 15A-15D illustrate the response time with respect to increasing number of unauthorized nodes. An observation is made that increasing the number of unauthorized nodes does not affect the response time of the network.

A further observation included evaluating the response time with the increasing number of validating nodes (i.e. authorized nodes). Here, the number of authorized nodes was increased for each transaction submitted. An authorized node prepared and submitted a transaction. This was validated by other authorized nodes and the response time of the blockchain network is obtained. For each transaction, the number of validating nodes was increased one at a time and the response time was recorded. FIGS. 16A-16D, 17A-17D, and 18A-18D show the response time of each node with increasing number of authorized nodes. It is observed that the response time slightly decreases with increasing number of authorized nodes. This is because more nodes are available to validate transactions, and this reduces the mining time of transaction. This accounts for the reason the response time reduces with increasing number of authorized nodes.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transient computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

What is claimed is:

1. A computer security system, comprising:
   at least one authorized node connected to a blockchain network and constructed and arranged to execute a consensus protocol for validating and verifying a blockchain transaction and to extract at least one of a signature or feature of a detected cyberattack for the blockchain transaction and mining the transaction to a blockchain network, wherein the authorized node includes an intrusion detection system (IDS) node that captures a cyberattack signature of the at least one of the signature or feature;
   at least one unauthorized node connected to the blockchain network and prohibited from executing the consensus protocol and from validating and verifying a blockchain transaction but authorized to retrieve the at least one of the signature or feature from the blockchain network; and
   a special-purpose hardware computer processor of the blockchain network that facilitates a distribution of the at least one of signature or feature for cooperative intrusion detection between the at least one authorized node and the at least one unauthorized node, wherein, after the blockchain transaction is validated and verified by the at least one authorized node, each of the at least one of the authorized node and each of the at least one of the unauthorized node receives an update that a blockchain block including a record of the blockchain transaction has been added to and connected to the blockchain network.

2. The computer security system of claim 1, wherein the IDS node converts the cyberattack signature to a standard format for electronic storage, and wherein the special-purpose processor facilitates the distribution of the converted cyberattack signature and feature to all IDS nodes of the at least one authorized node or the at least one unauthorized node in real-time or near real-time.

3. The computer security system of claim 1, further comprising a database for storing smart contracts and their application binary interfaces (ABIs) for retrieving a transaction address by the at least one authorized node and the at least one unauthorized node from the blockchain network.

4. The computer security system of claim 3, wherein the at least one authorized node has read and write access to the database and the at least one (unauthorized) authorized node has read-only access to the database.

5. The computer security system of claim 3, wherein the at least one authorized node and unauthorized node request the transaction address and ABI of the blockchain block including the blockchain transaction to obtain new content of the block including the at least one of the signature or feature, and wherein the at least one signature or feature is processed by a signature-based IDS corresponding to the at least one unauthorized node different than an IDS corresponding to the IDS node of the at least one authorized node.

6. The computer security system of claim 1, wherein the at least one authorized node verifies the transaction before the transaction is mined to the blockchain network.

7. The computer security system of claim 5, wherein the special-purpose processor of the blockchain network converts the at least one signature or feature to a standard format for storage and the at least one of the authorized and unauthorized nodes retrieves the standard formatted signature or feature from the transaction, and wherein the standard format provides compatibility with disparate IDS nodes including the signature-based IDS and anomaly-based IDS, and wherein the anomaly-based IDS detects zero-day attacks.

8. The computer security system of claim 7, wherein the at least one authorized node validates the transaction including chaining a block including the transaction to the blockchain and wherein the special-purpose process broadcasts a new current state of the ledger is broadcasted to the blockchain network, including the at least one unauthorized node connected to the blockchain network.

9. The computer security system of claim 8, further comprising a smart contract that facilitates the verification and conversion and the consensus protocol facilitates the validation.

10. The computer security system of claim 9, wherein the smart contract checks for a type field in the transaction to determine whether to rearrange the transaction to a standard format, to validate the transaction, or to remove the transaction.

11. The computer security system of claim 9, wherein the at least one unauthorized node includes permissionless access to join the blockchain network and to retrieve the stored at least one of the signature or feature.

12. A method for tracking cyberattacks, comprising:
   detecting a cyberattack using an intrusion detection system;
   extracting, by an authorized node of a combination of authorized nodes and unauthorized nodes connected to a blockchain network, at least one signature or feature from the cyberattack;
   attaching by the authorized node the extracted at least one signature or feature to a blockchain;
   updating a blockchain ledger with a new block including the at extracted at least one signature or feature; and
   distributing data regarding the updated blockchain ledger to both the authorized nodes and the unauthorized nodes, wherein the authorized nodes include a signature-based intrusion detection system (IDS) node that captures a cyberattack signature of the at least one of the signature or feature, wherein the unauthorized nodes are prohibited from validating and verifying the blockchain, and wherein, after the blockchain is validated and verified by the authorized nodes, each of the authorized nodes and unauthorized nodes receives an update that the new block has been added to and connected to the blockchain.

13. The method of claim 12, further comprising:
   converting the at least one signature or feature to a standard format;
   electronically storing the converted standard format of the at least one signature or feature in the blockchain; and
   retrieving by at least one of the authorized and unauthorized nodes the stored standard formatted signature or feature.

14. The method of claim 13, wherein converting the at least one signature or feature to the standard format comprises:
   converting the cyberattack signature to the standard format; and
   capturing by an anomaly-based IDS node a cyberattack feature of the at least one of the signature or feature and converting the cyberattack feature to the standard format.

15. The method of claim 13, further comprising monitoring for a type field in the transaction to determine whether to rearrange a transaction of the blockchain to a standard format, to validate the transaction, or to remove the transaction.

16. A computer program product for tracking cyberattacks, the computer program product comprising:
 a non-transitory computer readable storage medium having computer readable program code embodied therewith, the computer readable program code comprising:
 computer readable program code configured to detect a cyberattack;
 computer readable program code configured to extract at least one signature or feature from the cyberattack;
 computer readable program code configured to attach the extracted at least one signature or feature to a blockchain and store the attached at least one signature of feature at a database;
 computer readable program code configured to update a blockchain ledger with a new block including the at extracted at least one signature or feature; and
 computer readable program code configured to distribute data regarding the updated blockchain ledger to both authorized nodes and the unauthorized nodes connected to the blockchain, wherein the authorized node includes an intrusion detection system (IDS) node that captures a cyberattack signature of the at least one of the signature or feature, wherein the unauthorized nodes are prohibited from validating and verifying the blockchain, and wherein, after the blockchain is validated and verified by the authorized nodes, each of the authorized nodes and unauthorized nodes receives an update that the new block has been added to and connected to the blockchain.

17. The computer program product of claim 16, further comprising:
 computer readable program code configured to convert the at least one signature or feature to a standard format;
 computer readable program code configured to electronically store the converted standard format of the at least one signature or feature in the blockchain; and
 computer readable program code configured to retrieve by at least one of the authorized and unauthorized nodes the stored standard formatted signature or feature.

18. The computer program product of claim 16, further comprising:
 computer readable program code configured to convert the cyberattack signature to the standard format; and
 computer readable program code configured to capture a cyberattack feature of the at least one of the signature or feature and converting the cyberattack feature to the standard format.

19. The computer program product of claim 16, further comprising:
 computer readable program code configured to monitor for a type field in the transaction to determine whether to rearrange a transaction of the blockchain to a standard format, to validate the transaction, or to remove the transaction.

* * * * *